Jan. 22, 1957    E. C. FILSTRUP    2,778,309
GAS PRESSURE BLASTING DEVICE
Filed Aug. 14, 1952
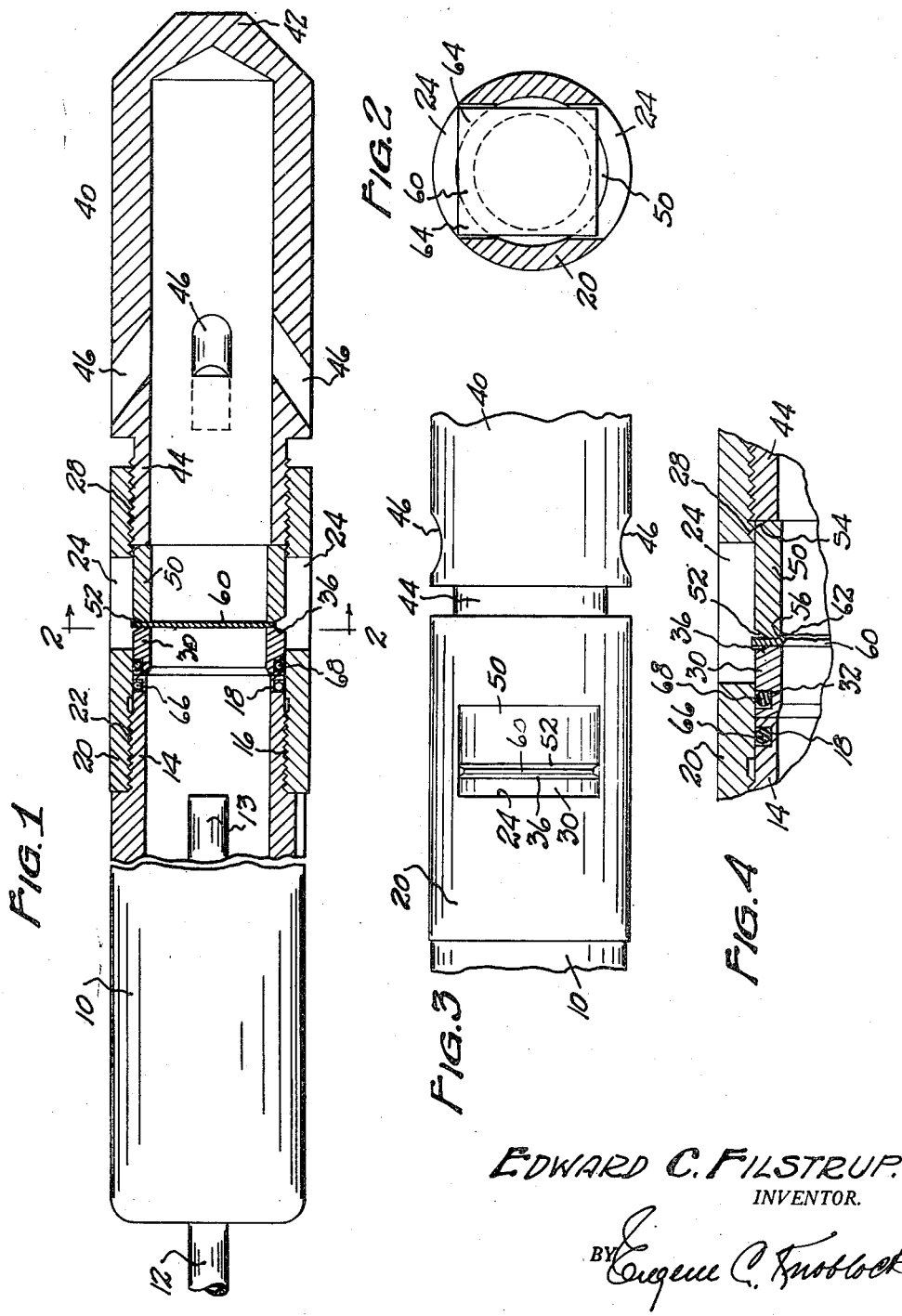
EDWARD C. FILSTRUP.
INVENTOR.
BY Eugene C. Knoblock
ATTORNEY.

United States Patent Office 2,778,309
Patented Jan. 22, 1957

2,778,309
GAS PRESSURE BLASTING DEVICE

Edward C. Filstrup, St. Joseph, Mich., assignor to Armstrong Coalbreak Company, Benton Harbor, Mich., a corporation of Michigan Application August 14, 1952, Serial No. 304,273

7 Claims. (Cl. 102—25)

This invention relates to improvements in gas pressure blasting devices. More particularly, it relates to a device adapted to be inserted in a hole in the working face of a coal mine or in a mass of material to be broken and which may be operated to discharge a force sufficient to break down the coal in the mine or to break up the mass of material in which it is employed.

This device is similar to that illustrated in my copending patent application, Ser. No. 256,877, filed November 17, 1951, in that it employs a shear plate which is clamped in position in a multiple-part blasting cartridge as the means for determining the pressure at which the device operates to release a blasting charge. Such devices will be referred to as of the shear plate type.

Devices of the shear plate type have proven to be effective and to possess many advantages as outlined in my copending patent application. They do, however, possess one disadvantage in that it is sometimes difficult to remove a spent or fractured shear plate after discharge. The action of fracture of a shear plate is preceded by distortion of the shear plate, and, in this distortion, a tendency of the shear plate to bite into the outermost part which clamps it occurs. Such a biting action between the shear plate and the outer clamping member interlocks those parts so that it is difficult to remove the shear plate, especially where the latter is seated in an opening in a sleeve or the like separate from the clamping member and with respect to which the clamping member must rotate in order to release the clamping action. Where such a condition exists, the biting action or interlock between the parts prevents or retards rotation of the cap upon the shell and necessitates the use of special tools to remove the parts and to release the fractured shear plate.

It is the primary object of this invention to provide a construction wherein the foregoing difficulties are overcome so that a fractured shear plate may be removed easily and quickly, regardless of whether or not the distortion of the shear plate has caused it to interlock with the outer clamp member engaging thereagainst.

A further object is to provide a two-part gas containing cartridge whose parts are adapted to be separated by a shear plate, with a pair of clamp rings bearing against opposite sides of said shear plate and shiftable relative thereto, so that any physical interlocking of the shear plate with a clamping member does not interfere with or retard the separation of the housing parts to release the clamping pressure exerted in the device against the fragmentary or residual portion of a shear plate remaining in the device after the device has been discharged.

A further object is to provide a novel, simple and inexpensive construction of blasting cartridge in which a cylindrical member is provided with apertures to receive a shear plate to span a restricted passage within said member, and an apertured end cap is threaded in said sleeve and bears endwise against a cylindrical member with respect to which it is free to rotate and which clampingly engages said shear plate.

Other objects will be apparent from the following specification.

In the drawing:

Fig. 1 is a side view of the device with parts shown in longitudinal or axial section.

Fig. 2 is a transverse sectional view taken on line 2—2 of Fig. 1.

Fig. 3 is a fragmentary side view of the device viewed at an angle 90 degrees displaced from the position of the parts in Fig. 1.

Fig. 4 is an enlarged fragmentary longitudinal sectional view of the device illustrating the fractured shear member.

Referring to the drawing which illustrates the preferred embodiment of the invention, the numeral 10 designates an elongated tubular cartridge or container part having a strength and wall thickness adequate to sustain fluid pressures substantially in excess of the pressure of the blasting charge to be employed in the device. The body part 10 will have an apertured end wall (not shown) to which is connected a supply conduit 12 which communicates with a source of gas under pressure, such as an air compressor. The supply conduit will communicate with the interior cavity of the cartridge part 10 so that a charge of gas under pressure may be introduced into said cartridge. The opposite end of the tubular part 10 preferably includes a neck portion 14 having a reduced outer diameter with an exteriorly screw-threaded portion 16 extending for a part of the length of said neck and preferably spaced from its ends. Between the screw-threaded portion 16 and the end of the neck 14 is formed an external circumferential groove 18.

A tubular sleeve or collar member 20 having an outer diameter or cross-sectional dimension substantially equal to the outer diameter or dimension of the part 10, and having an inner diameter of a size to permit it to encircle the neck portion 14, has an internally screw-threaded part 22 engaging the screw threads 16 of the neck to anchor said sleeve 20 to the neck 14. The sleeve 20 is of a length to project substantially beyond the end of the neck 14. The projecting portion of the sleeve 20 has one or more lateral openings, here shown as a pair of diametrically opposed slots 24. Each opening 24 is of substantial length and width, the dimension thereof transverse of said cartridge preferably being substantially equal to the inner diameter of said sleeve, as best seen in Fig. 2. The outer end portion of the sleeve, that is, the portion between the opening 24 and the outer end, is internally screw-threaded at 28.

A rigid annular member or clamping ring 30 is received within the sleeve 20. The clamping ring 30 has an inner diameter substantially equal to or slightly less than the inner diameter of the neck portion 14 and the tubular part 10 and abuts against the outer end surface of the neck 14. The rear or innermost end portion of the ring 30 has an outer diameter substantially equal to the outer diameter of the adjacent end portion of the neck 14 and is interrupted by an outer circumferential groove 32. The ring 30 preferably has a snug sliding fit in sleeve 20, so that axial movement of the ring 30 is accommodated, when desired, but the parts fit snugly enough so that the sealing means described hereinafter are effective to hold the ring 30 against separation from sleeve 20 under normal conditions. The outer end portion 36 of the ring 30 is of reduced thickness as defined by a taper or frusto conical surface, and the outer end surface of the ring 30 is preferably flat and lies in a plane transverse of the axis of the ring 30. The length of the member 30 is such that, when its inner end surface bears against the end surface of the neck 14, its outer end surface will be located intermediate the length of the openings 24 of the sleeve 20.

An end cap, having a tubular or cylindrical portion 40 with an outer diameter or dimension substantially equal to or conforming with the outer dimensions of the part 10 and the sleeve 20, is mounted upon the sleeve 20. The cap has an end wall 42 at one end and has a reduced neck portion 44 at its opposite end. The neck portion 44 is externally screw-threaded to engage the internal threads 22 on the outer ends of the sleeve 20. The end surface of the reduced neck portion 44 of the cap is flat or planar and perpendicular to the axis of the cap. The cap is made of steel or other metal of substantially the same strength and hardness as parts 10, 20 and 30. The inner diameter of the end portion 44 is preferably substantially equal to the inner diameter of the ring 30. A plurality of discharge passages 46 are formed in the cylindrical wall 40 of the cap, preferably spaced a substantial distance from the end wall 42 and adjacent to the neck 44, as illustrated. The passages 46 extend in a general radial but inclined direction so as to extend at an angle to the axis of the cap and to a plane transverse of the axis of the cap. The outer end of each passage is positioned rearwardly relative to the inner end of the passage, i. e., at a greater distance from the end wall 42. The total cross-sectional area of all of the discharge passages 46 will preferably be substantially equal to the cross-sectional area of the bores of the parts 30 and 44.

A cylindrical member or ring 50 fits within the sleeve 20 at the outer end thereof. The ring 50 has inner and outer diameters preferably substantially equal to or similar to the inner and outer diameters of the cylindrical member 30, said diameters being so selected that the member 50 will be free to shift or move within the sleeve 20 in both an axial direction and a rotative or circumferential direction. The member 50 is preferably formed of a hardened material possessing substantially the same properties as the member 30 and cooperates with the member 30 to serve as an outer clamping member or shear ring. One end portion of the member 50 preferably has a frusto conical end surface 52 defining a part only of the end thereof, the remainder of the end surface being substantially flat and lying in a plane perpendicular to the axis of said ring. Similarly, the opposite end of the shear ring 50 has a frusto conical or beveled surface portion 54 and a flat inner end portion perpendicular to the axis of the ring. The provision of the beveled or frusto conical surfaces 52 and 54 reduces the area of contact of the shear ring 50 with parts bearing thereagainst, as is well illustrated in Fig. 4.

A plate 60, preferably of rectangular shape as illustrated in Fig. 2, is clamped between the inner ring 30 and the shear ring 50. The plate 60 is of a size to accommodate continuous engagement thereof with the end surfaces of the rings 30 and 50, and at the same time has at least a slight clearance with the opposite circumferentially spaced end walls of each of the slots 24, as seen in Fig. 2. The corner portions 64 of the plate 60 are usually positioned adjacent to or will project slightly beyond the outline of the sleeve 20 to facilitate grasping of such corner portions by the fingers of the user. In this connection the width of each slot 24, that is, its dimension parallel to the axis of the sleeve 20, will be such as to facilitate entry of the fingers of a user partly into the slot to facilitate gripping of such corner portions 64.

The joints between the sleeve 20 and the neck 14, and between the sleeve 20 and the annular member 30, are sealed. For this purpose an annular resilient sealing member 66 is seated in the circumferential groove 18 of the neck 14 of the body, and a similar annular resilient sealing member 68 seats in the circumferential groove 32 of the annular member 30. These seals 66, 68 are commonly known in the art as "O-rings" and are of the type which are formed of natural or synthetic rubber and are adapted to be deformed under pressure so that the seal is improved as pressure increases.

For the purpose of cooling the portion of the device adjacent to the severable closure plate 60, a conduit 13 may be connected with the line 12 to extend adjacent to the member 60 as illustrated. The action of discharging air from the pipe serves to introduce a cooling action in the area of the discharge. It will be understood in this connection that if there are other points along the length of the body 10 at which a cooling action is desired, the same may be provided by locating aperatures (not shown) in the conduit 13 to discharge a portion of the air through said aperatures. It will be understood, of course, that the conduits 12 and 13, as here illustrated, are adapted only for use with devices operating by compressed air. Other means of supplying a gas may be provided as in the case where the device is to be charged by carbon dioxide or like gas and is further equipped with means for heating the gas to expand it rapidly and thereby develop the desired blasting pressure.

The operation of the device, assuming that it is operated by compressed air, will now be described. The body 10, the sleeve 20 and the ring 30 are assembled to constitute one part or unit of the device, and the supply conduit 12 is connected thereto. The shear ring 50 is a separate part which is received within the first unit but is readily removable therefrom in the event the cap or end member 40, 42, which constitutes an additional unit of the device, should be removed. The final operating part of the device is the plate 60 which is removed after each operation of the device. Assuming that the cap is screw-threaded within the portion 28 of the sleeve 20 and that the shear ring 50 is positioned loosely within the sleeve 20 between the end wall of the cap 40 and the clamping ring 30, the device is ready to be conditioned for use. A plate 60 is slid through opening 24 in the sleeve 20 at a position between and in engagement with the frusto conical surfaces 36 of the ring 30 and 52 of the ring 50. Assuming that the rings 30 and 50 are free to move to a position spaced apart a distance greater than the thickness of the plate 60, the plate in cooperation with the aforesaid frusto conical surfaces will act as a cam to separate said clamping parts and facilitate the insertion of the plate between the confronting ends of the ring members 30 and 50, as illustrated in Figs. 1, 2 and 3. The plate 60 is of a size to completely span the bores of the members 30 and 50 and to be contacted and engaged continuously and circularly by the end surfaces of said members 30 and 50. Then while the plate 60 is held in this position, the cap 40, 42 is rotated as by manual manipulation, and preferably without the use of a wrench or other tool, to urge the shear ring 50 toward the plate 60 and thereby to firmly clamp or grip the plate 60 between the parts 30 and 50. When the clamp has been rotated sufficiently to effect the clamping action aforesaid, the device is ready for use, and the test of whether or not it is ready for use is solely whether or not the clamping action is great enough to prevent accidental displacement of the plate 60 from a spanning or closing position relative to the bores of the ring members 30 and 50.

Assuming that the device is used as a coal breaker in a coal mine and that a hole has been drilled in the coal seam, or, if used for any other purpose, that an opening has been formed in the material to be broken, which opening is of a size to slidably and snugly receive the device, then the cartridge will be inserted into that hole with the cap end thereof foremost or innermost. Compressed air or other gas under pressure will then be fed into the cartridge through the conduit 12 until the charge reaches a pressure which will rupture or sever the plate 60. As the pressure increases within the cartridge during charging, the gas under pressure passes between the confronting end surfaces of the neck 14 and the clamping ring member 30. This gas is prevented from leaking to atmosphere, however, by the annular resilient sealing members 66 and 68. The pressure of the gas which passes between the confronting end surfaces of the parts 14 and 30 and exerted against said surfaces is effective to urge the clamping member 30 longitudinally and outwardly to increase the clamping pressure acting against the plate 60; thus, inasmuch as the cap 40 holds the shear ring 50 against any axial displacement in the sleeve 20, and since the ring 30 responds to gas pressure and is free to move axially, the clamping action or force exerted upon the plate 60 is proportional at all times to the pressure of the gas within the cartridge. The positive increase in the gripping force, as aforesaid, increases the tightness of the abutment of the shear ring with the plate 60, thereby increasing the effectiveness of the seal between the contacting metal parts 30 and 60 in a manner to prevent leakage between said parts and through the openings 24 to atmosphere.

The plate 60 is preferably formed of a mild steel having at least a measure of ductility and being softer and weaker than the other parts of the device. As the pressure within the cartridge increases, it reaches a point where the plate 60 commences to bulge at the central portion thereof. This bulging, deforming or bending action continues and increases as the charge of gas within the cartridge increases until the maximum pressure or force which the plate 60 can withstand is reached. As this deforming action occurs, the grip of the parts 30 and 50 upon the margin of the plate 60 maintains that margin against inward slipping or movement, with the result that the central bulged portion of the plate is stretched and reduced in thickness. The stretching occurs principally and continuously at the circular portion defining the margin of the part of the plate which is deformed by the pressure. The deforming or bulging action continues until the circular portion of the plate at the point where the deforming action commences has been stretched or weakened to an extent that it suddenly severs. The severing action is usually characterized by an instantaneous and continuous breaking or shearing thereof from its gripped marginal portion at the weakened circular portion of the plate defined or determined by the size and shape of the inner surface of the shear ring member 50. Thus the deformed central portion is separated from the plate as a slug comparable to the slug produced in a metal punching operation. The severing of this slug from the plate releases it and it is propelled by the escaping gas charge against the end wall 42 of the cap. The cap is preferably of such a length that the space between the plate 60 and the end 42 of the cap provides a sufficient distance of travel to permit the severed slug to attain a high velocity as propelled by the high pressure, high velocity discharge of gas from the body 10. The velocity of the slug is usually so high that when it strikes the end wall 42, it crumples or falls incident to impact so that its overall size is reduced and it will not bind itself within the end cap but is freely movable therein. The severing of the entire central portion of the plate 60 produces a discharge opening of a size substantially equal to the inner diameter of the members 30 and 50 so that the air charge contained within the cartridge 10 may pass without restriction through the members 30 and 50 and into the cap 40 for discharge at the outlet ports 46.

Because of the manner in which the plate 60 is deformed as above described, with the reaction of the pressure upon the plate 60 being localized in the annular portion of the plate substantially coinciding with the inner diameter of the shear ring 50, the inner peripheral portion 62 of the severed or fractured plate will commonly be deformed, as illustrated in Fig. 4. This deforming action commonly results in deforming of the clamping edge of the shear ring 50, as illustrated at 56 in Fig. 4. The distortion is of the character commonly known as one in which one metal "bites into" the other or interlocks therewith. Such biting action commonly is limited to the inner margin of the normally flat reduced size end surface of the ring 50 inwardly of the frusto conical end surface 52 thereof, and, because so limited, does not greatly alter the efficiency or operativeness of the device for re-use. In other words, it does not prevent the device from performing an effective clamping action upon the margin of the plate 60. It will be apparent, however, that if it prevents effective clamping of the plate 60, then the ring may be removed and replaced rapidly and easily by the simple expedient of completely removing the cap 40, removing the ring 50 from the sleeve 20, inserting a new ring 50, and reapplying the cap. Thus the device is rendered economical in operation so that its point of greatest wear, namely, the part thereof providing the shearing edge, is readily replaceable and is inexpensive and simple in construction, and can be installed rapidly.

The greatest advantage of the device, however, resides in the fact that the removal or release of the cap 40 is not interfered with when an interlocking action occurs between the annular fragment of the shear plate 60 and the shear member against which it was cut. The plate 60 is preferably of a rectangular form, as best illustrated in Fig. 2, the rectangular form being inexpensive and having the further practical advantage that its corner portion 64 may readily be grasped by the user of the device, as required during use of the device. In other words, the user can insert his fingers only a slight distance into the aperture 24 of the sleeve 20 and by doing so effect a grip upon the corner portion 64 of the shear plate. It will be apparent from a consideration of Fig. 2 that such a rectangular member cannot rotate within the sleeve 20. Consequently, if any action occurs in the use of the device which will necessitate rotation of the rectangular plate, then the plate becomes a lock which prevents that rotation. In the present device, no requirement exists for rotation of the plate 60. Thus, when the device has been operated to discharge it and it is desired to release the fractured remnant of the plate 60, all that is required is to rotate the cap 40. The cap 40 has end engagement at only a restricted area with the flat outer end portion of the shear sleeve 50, and, consequently, the only force necessary to be exerted to produce rotation of the cap relative to the sleeve 20 is a force sufficient to disengage the limited end bearing engagement between the cap sleeve 44 and the shearing ring 50. This force need not be much greater than the manual force which was exerted during the original assembly of the parts, by reason of the fact that the pressure tending to exert the clamping action upon the plate has now been released so that the ring 30 is no longer driven or held with great clamping force or pressure against the plate 60. Observe in this connection that, if there is an interlocking or binding action between the metal of the parts 50 and 60 such that the engagement of the plate 60 in the apertures 24 of the sleeve 20 tends to hold the ring 50 against rotation with the neck 44 of the cap 40 as the latter is released, that action is not detrimental. Stated differently, the formation of the shearing ring 50 independently of the cap 40 permits the shearing ring to remain stationary while the cap 40 is being rotated to a releasing position. It will be apparent that once the cap 40 has been backed off a short distance, the parts will be freed so that all that is required to disengage the plate fragment from the shearing ring is an impact sufficient to release the interlock at 62, 56. When so released, the plate may fall out through the apertures 24 and a new plate may be inserted and the cap again threaded to clamp the new plate. Observe in this connection that it is not required to completely remove the cap 40 and that in normal operation only a short longitudinal displacement of the cap 40 from its clamping position is necessary to release the parts. Normally, one or two revolutions of the cap will be ample to release the clamping parts for removal of the fragments of the plate 60 and insertion of a new plate.

While the preferred embodiment of the invention has been illustrated and described, it will be understood that changes in the construction may be made within the scope of the appended claims without departing from the spirit of the invention.

I claim:

1. A blasting device comprising a two-part cartridge adapted to contain gas at high pressure, one of said parts having an end portion removably secured in the other part, a pair of clamping rings rotatably and freely axially slidable in said other part, one clamping ring being engaged by said end portion, each of said cartridge parts having lateral apertures therein, the apertures in said other part being intersected by the clamping ends of said clamping rings, a shear plate clamped between said rings, and an annular resilient sealing member encircling and sealing the clamping ring at the charge pressed side of said shear plate.

2. A blasting device comprising an open ended cartridge adapted to contain gas at high pressure, a rigid pressure responsive axially shiftable clamping ring freely axially slidable within said cartridge, peripheral sealing means encircling said clamping ring and sealingly engaging said cartridge, a shear ring freely axially slidable within said cartridge, a frangible closure plate interposed between and adapted to be continuously marginally clamped by said rings, and an apertured cap releasably mounted on the cartridge at its open end and defining an abutment for said shear ring said clamping ring exerting a clamping pressure on said plate substantially proportioned to the gas pressure in said cartridge.

3. A blasting device comprising an open ended cartridge adapted to contain gas at high pressure, a rigid pressure responsive clamping ring freely axially slidable within said cartridge, peripheral sealing means encircling said clamping ring and circumferentially engaging said cartridge, a shear ring freely axially slidable within said cartridge, a frangible closure plate interposed between said rings, and an apertured cap releasably mounted on the cartridge at its open end and defining an abutment for said shear ring, the confronting ends of said rings being partly defined by tapered surfaces said clamping ring exerting a continuous marginal clamping action on said plate with a force varying according to the gas pressure in said cartridge.

4. A blasting device comprising an open ended cartridge adapted to contain gas at high pressure, a rigid pressure responsive clamping ring freely axially slidable within said cartridge, peripheral sealing means encircling said clamping ring and sealingly engaging said cartridge, a shear ring freely axially slidable within said cartridge, a frangible closure plate interposed between said rings, and an apertured cap releasably mounted on the cartridge at its open end and defining an abutment for said shear ring, the confronting ends of said rings being of reduced thickness and each being defined by a flat end surface perpendicular to the axis of the ring and a substantially frusto conical surface, said flat end surfaces continuously gripping the margin of said plate with a force substantially proportional to the gas pressure in the cartridge.

5. A blasting device comprising an open ended cartridge, a shear plate, an apertured closure releasably mounted on said cartridge, a rigid pressure responsive freely axially slidable clamping ring having a peripheral sealed relation with said cartridge in all positions in said cartridge and continuous sealing end engagement with the margin of the inner face of said plate, and a shear ring interposed between said plate and abutting said closure and freely axially slidable in said cartridge when said closure is released.

6. A blasting device comprising an open ended cartridge, a shear plate, an apertured closure releasably mounted on said cartridge, a rigid pressure responsive freely axially slidable clamping ring having a peripheral sealed relation within said cartridge in all positions in said cartridge and sealing continuous end engagement with the inner face of said plate, and a shear ring interposed between said plate and closure and adapted for free axial sliding movement in said cartridge when said closure is released, said shear ring having reduced end surfaces for restricted area face engagement with said plate and said closure.

7. A blasting device comprising an open ended cartridge, a shear plate, an apertured closure releasably mounted on said cartridge, a rigid pressure responsive freely axially slidable clamping ring having a peripheral sealed relation with said cartridge in all positions thereof in said cartridge and sealing continuous end engagement with the inner face of said plate, and a shear ring interposed between said plate and closure and adapted for free axial sliding movement in said cartridge when said closure is released, said cartridge having a lateral plate receiving aperture therein located in alignment with said plate between the end of said cartridge and the seal between said cartridge and clamping ring.

References Cited in the file of this patent

UNITED STATES PATENTS

| | | |
|---|---|---|
| 1,779,595 | Helmholtz et al. | Oct. 28, 1930 |
| 1,816,257 | Kneeland | July 28, 1931 |
| 1,881,564 | Helmholtz et al. | Oct. 11, 1932 |
| 2,145,366 | Myers | Jan. 31, 1939 |

FOREIGN PATENTS

| | | |
|---|---|---|
| 658,579 | Germany | Apr. 6, 1938 |